United States Patent [19]

Beane

[11] 4,284,507

[45] Aug. 18, 1981

[54] KNIT PILE FILTER

[76] Inventor: Frank T. Beane, Rte. #7, Highway #49, Concord, N.C. 28025

[21] Appl. No.: 37,286

[22] Filed: May 9, 1979

Related U.S. Application Data

[63] Continuation-in-part of Ser. No. 904,485, May 10, 1978.

[51] Int. Cl.³ ............... B01D 23/04; B01D 29/14; B01D 46/02
[52] U.S. Cl. ............... 210/435; 55/341 NT; 55/381; 55/477; 55/DIG. 43; 66/170; 66/194; 112/10; 112/262.2; 210/323.2; 210/497.01; 210/500.1
[58] Field of Search .......... 55/97, 341 NT, 381–382, 55/522, 278, 527–528, 361, DIG. 43, 477; 210/500 R, 323 T, 435, 497 R; 66/170, 194; 112/10, 262; 428/85, 92–93

[56] References Cited

U.S. PATENT DOCUMENTS

| | | | |
|---|---|---|---|
| 459,866 | 9/1891 | Clewley | 66/170 |
| 1,190,512 | 7/1916 | Cameron | 55/522 X |
| 1,749,734 | 3/1930 | Kelly | 112/10 X |
| 1,758,881 | 5/1930 | Birkholz | 55/527 |
| 2,100,951 | 11/1937 | Glass et al. | 55/382 UX |
| 2,431,888 | 12/1947 | Pick | 112/10 X |
| 2,805,731 | 9/1957 | Kron | 55/341 NT X |
| 2,935,158 | 5/1960 | Braun | 55/278 |
| 2,936,513 | 5/1960 | Ibach, Jr. | 428/85 X |
| 3,024,518 | 3/1962 | Newton | 428/85 X |
| 3,090,097 | 5/1963 | Ruckstuhl | 428/93 X |
| 3,293,724 | 12/1966 | Kimball | 66/202 X |
| 3,331,221 | 7/1967 | Lawson, Jr. | 66/170 |
| 3,434,306 | 3/1969 | Auville et al. | 66/194 X |
| 3,492,998 | 2/1970 | Mascaro | 55/522 UX |
| 3,547,749 | 12/1970 | White et al. | 428/92 X |
| 3,793,851 | 2/1974 | Thorneburg | 66/194 X |
| 3,973,935 | 8/1976 | Moore, Jr. et al. | 55/381 X |
| 3,977,847 | 8/1976 | Clark | 55/96 |
| 4,058,379 | 11/1977 | Cheng | 55/341 NT X |
| 4,105,421 | 8/1978 | Rheinfrank, Jr. et al. | 55/381 X |
| 4,126,560 | 11/1978 | Marcus et al. | 55/487 X |
| 4,172,165 | 10/1979 | Kieckhefer et al. | 428/92 |

FOREIGN PATENT DOCUMENTS

| | | | |
|---|---|---|---|
| 628115 | 9/1961 | Canada | 55/97 |
| 1184637 | 7/1959 | France | 66/202 |
| 698751 | 10/1953 | United Kingdom | 55/528 |
| 1110190 | 4/1968 | United Kingdom | 66/194 |

OTHER PUBLICATIONS

*Fundamentals of Fabric Collectors and Glossary of Terms*, Publication No. F-2, I.G.C.I., Sep. 1969.

*Primary Examiner*—Kathleen J. Prunner

[57] ABSTRACT

A filter, and apparatus and methods using the filter, in the form of a knitted fabric having particular characteristics and effective for separating materials from flowing fluid streams.

15 Claims, 7 Drawing Figures

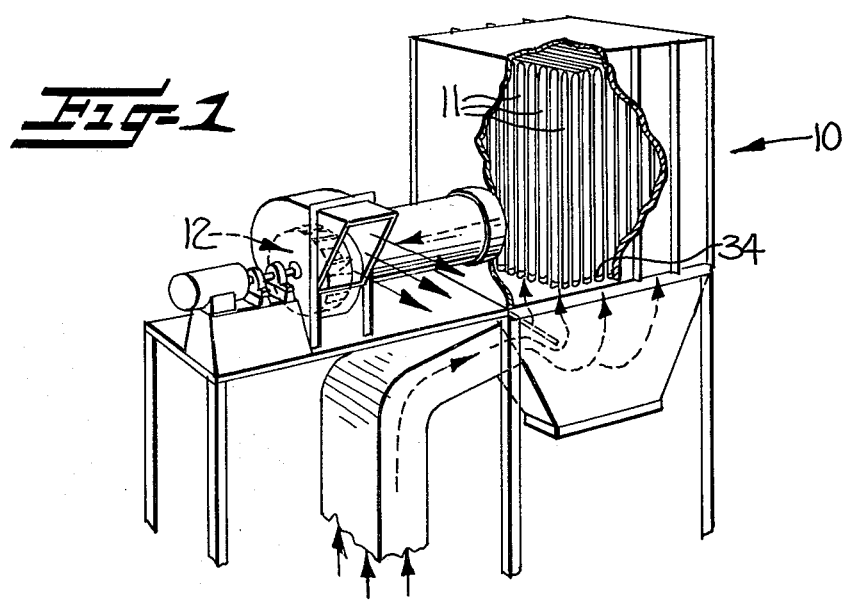
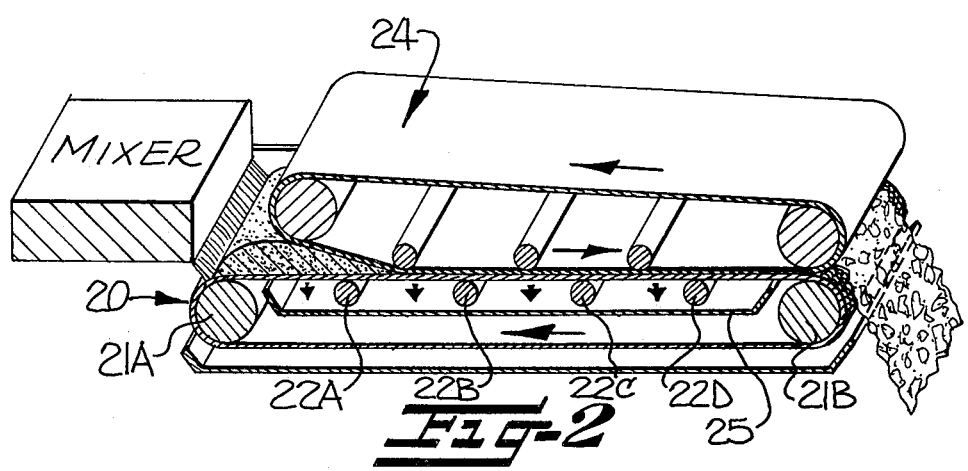
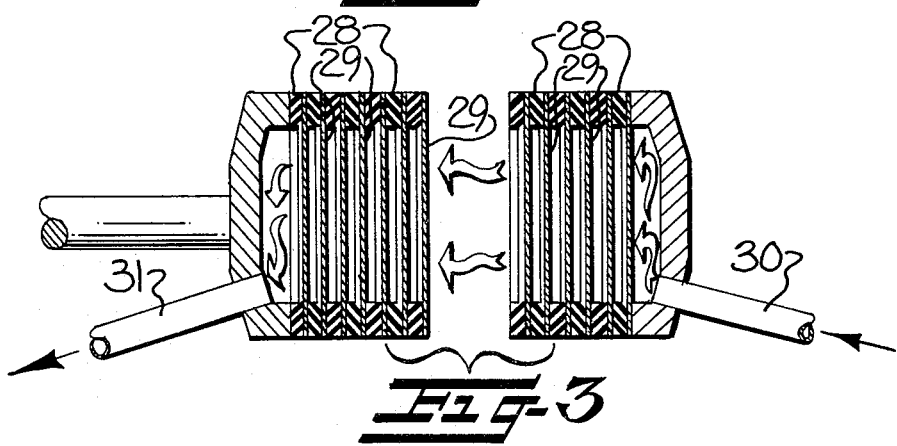

KNIT PILE FILTER

FIELD AND BACKGROUND OF INVENTION

This application is a continuation-in-part of copending application Ser. No. 904,485, filed May 10, 1978 and entitled FILTERING APPARATUS AND METHOD.

Many industrial processes require the use of apparatus and method for filtering flowing fluid streams and separating materials from the fluids. Such arrangements and processes may include separating solid particulate matter from liquids or from gases. In many such arrangements and processes, it has been known to provide a filter material, structure which supports and may enclose the filter material, and some circulating device such as a fan or pump which causes a flow of fluid to pass through the filter material. Particularly in circumstances where the flowing fluid stream carries solid particulate matter as the material to be separated, the filters employed have taken the form of bags, belts, and sheets or plates produced from suitable sheet material or the like. One advantage which has been found, in the past, for certain such arrangements and processes has been that the supporting structures can be arranged so as to employ the fluid flows in such a way as to assist in maintaining the filter material in the desired position. One example of such a structure is to be found in conventionally known bag filter arrangements where a bag of filter material may be held in expanded condition by the flow of a fluid from the interior of the bag to the exterior of the bag.

Heretofore, materials employed in forming filters of the type described have been predominantly of types which are difficult to fabricate and which, in many environments, are suitable only for single use. One example of such a material which has been widely used heretofore is a felted or non-woven textile material such as may be formed by spun-bonded textile fiber. Such materials are relatively difficult to fabricate into bags, belts and the like, and are difficult to clean so as to permit a second use of the filter material. Further, such fabric materials, including woven fabrics, provide varying filtration characteristics inasmuch as the size of pore openings through which particulate matter may pass is uncontrolled and variable from one portion of the sheet material to another. Such variation in pore size or open areas in the filter material or media has at least two undesirable effects, namely permitting passage of particulate matter in an undesirable size range and permitting loading of the filter material in an uneven manner as particulate matter accumulates.

BRIEF SUMMARY OF INVENTION

With the above discussion particularly in mind, it is an object of the present invention to provide a filter media or material capable of separating materials from a flowing fluid stream and in which the open areas of the filter material are more closely and uniformly controlled and are more readily maintained open for passage of fluid during operation of the apparatus. In realizing this object of the present invention, filter material in accordance with the present invention comprises a knitted pile fabric having certain characteristics pointed out in greater detail hereinafter.

Yet a further object of the present invention is to equip filter apparatus of varying types with filters which may be cleaned and repeatedly reused. In realizing this object of the present invention, knitted pile fabric made in accordance with the present invention is formed into the necessary or desired configuration for use in a range of types of filtering apparatus.

Yet a further object of the present invention is to separate materials from a flowing fluid stream in accordance with a method which includes the steps of knitting crimped, synthetic multi-filament yarn into a fabric having stitches defining open areas in a predetermined particular range of sizes. In accomplishing this object of the present invention, more closely controlled sizes of particulate matter are separated by the filter.

The filter material of the present invention, used in apparatus and methods is described more fully hereinafter, is produced by knitting crimped, synthetic multifilament yarn having a denier in the range of from about 70 to about 300 into a fabric with stitches in courses having from about eight stitches to about thirteen stitches per centimeter and defining open areas in the range of from about one micron to about one hundred microns. Preferably, the knitting includes forming the yarn into stitches defining a ground and stitches defining a terry loop pile extending from the ground to a height in the range of from about 0.5 millimeters to about four millimeters.

BRIEF DESCRIPTION OF DRAWINGS

Some of the objects having been stated, other objects will appear as the description proceeds, when taken in connection with the accompanying drawings in which FIG. 1 is a perspective view, partly broken away, of a bag filter apparatus incorporating a filter in accordance with the present invention;

FIG. 2 is a perspective view, partially schematic and partially in section, of an apparatus incorporating a belt filter in accordance with the present invention;

FIG. 3 is a schematic, elevation view, in section, of an apparatus incorporating plate filters in accordance with the present invention;

DETAILED DESCRIPTION OF INVENTION

Figure 4:
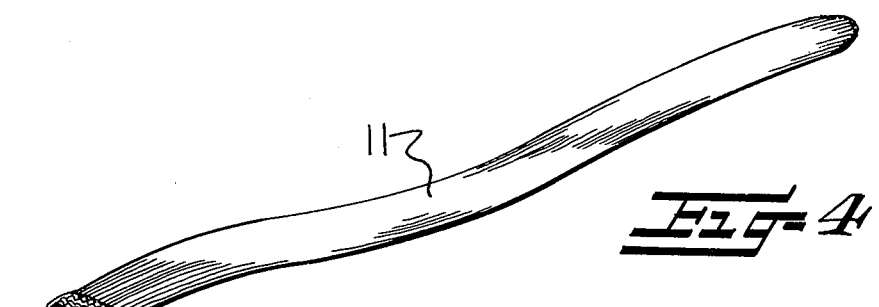
FIG. 4 is a perspective view of a filter bag as used in the apparatus of FIG. 1.

While the present invention will be described more fully hereinafter with particular reference to the accompanying drawings, it is to be understood at the outset of the following description that it is contemplated that persons skilled in the appropriate arts of manufacturing knitted fabrics and of filtering materials from flowing fluid streams will be enabled, by the disclosure which follows, to construct and use filter materials, apparatus and methods other than those here specifically described while attaining the favorable results of the present invention. Accordingly, the following description is to taken broadly as an enabling teaching directed to persons skilled in the appropriate arts, and not as restrictive upon the scope of this invention.

Referring now more particularly to the accompanying drawings, a bag filter apparatus is there shown in which a housing means is generally indicated at 10 and functions for closing and supporting bags generally indicated at 11 which are formed from a filter material in accordance with the present invention and which function for separating materials from a fluid. The housing 10 may take the particular form of a sheet metal structure such as a cabinet, case or the like forming a portion of a conduit through which a flowing fluid stream passes. While the apparatus of FIG. 1 is of a type particularly useful with gases such as air, the term "fluid" as used herein is intended to be understood broadly, encompassing both gases such as may flow through ducts and liquids such as may flow through pipes.

In the form shown, a circulating means operatively communicates with the housing 10 and filter bags 11 for directing a flow of air through the housing and the bags. More particularly, the circulating means is illustrated in the form of a fan generally indicated at 12, for inducing the flow of air through the housing 10 and the bags 11.

An alternative form of filter apparatus is illustrated in FIG. 2. There, an apparatus of the type known to persons skilled in the arts of filtering fluids flows as a "belt filter" is illustated. As shown schematically, a mixer or other means appropriate to the particular process being carried forward delivers onto the surface of an underlying belt generally indicated at 20 a mixture of liquid and some particulate matter such as clay, sludge or the like. The belt filter 20 is trained about suitable support means such as a pair of end rolls 21A, 21B and is supported in an appropriate manner such as by intermediate rollers 22A, 22B, 22C and 22D. A suitable press belt generally indicated at 24 is similarly mounted and supported and cooperates with the filter belt 20 for squeezing material delivered therebetween in such a manner as to express liquid from the material through the filter belt 20. Material from which liqud has been pressed is delivered from the filter belt 20 as the filter belt 20 and press belt 24 part (to the right in FIG. 2).

Yet another form of filter apparatus employing filter material in accordance with the present invention is illustrated in FIG. 3, where a schematic, elevation view of a plate filter may be noted. As is known to persons skilled in the filtering art, a plate filter is assembled with a stack of filter plates 28 having appropriately sized sheets 29 of filter material interposed therebetween. A stack of plates 28 and filter pads 29 are compressed together by a suitable means and a fluid to be filtered is then passed from one end of the stack to the other.

As will be noted, each of the filter apparatus of FIGS. 1-3 includes an inlet and an outlet for fluid flow and support structure for positioning filter material between the inlet and the outlet. In FIG. 1, an inlet duct delivers gas flow into housing 10 while an outlet duct delivers gas flow from the housing to the fan 12. In the belt filter of FIG. 2, the inlet means may take the form of a discharge from the mixer or other appropriate device, while the fluid outlet is in the form of a catch pan 25 positioned to underlie a run of the filter belt 20 through which liquid is pressed. The filter press of FIG. 3 has inlet and outlet conduits 30, 31.

Turning now to a more complete description of the characteristics of the filter material used in each of the apparatus of FIGS. 1-3, attention will be particularly directed to a bag 11 as is used in the apparatus of FIG. 1. However, as persons skilled in technical arts will appreciate, the fabric described can be formed either into bags or opened into running widths and fabricated into belts or sheets as required for the other forms of apparatus described above.

In the form indicated in FIG. 1, each bag 11 is closed at one end such as by stitching and open at the other end for positioning about a mounting ring as is known to persons skilled in filtering arts. Such a bag 11 is illustrated, in slightly enlarged form in FIG. 4. In use, an open end 34 of the bag will be secured about a throat ring or the like for flow of gas containing entrained particles into the interior of the bag. As gas flows outwardly through the fabric of the bag 11, particles are separated from the flowing stream of gas and are retained within the bag. Clean gas is then exhausted, under the inducement of any circulating fan.

Figure 5:
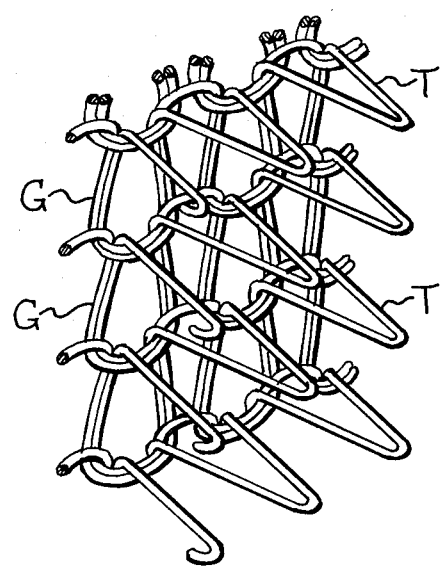
FIG. 5 is a schematic representation of the knit fabric of the filter material used in the apparatus of FIGS. 1-3.
Figure 6:
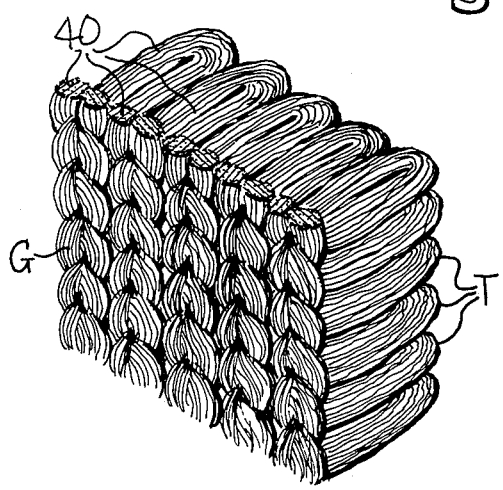
FIG. 6 is a perspective view, from the ground side, of a fabric filter material in accordance with the present invention.
Figure 7:
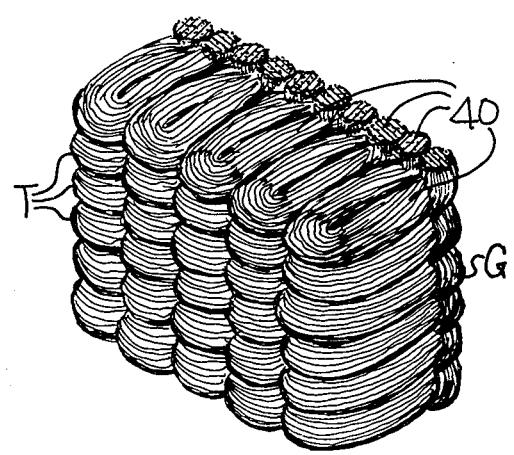
FIG. 7 is a view similar to FIG. 6, from a pile side of a fabric in accordance with this invention.

In accordance with particular features of the present invention, the filter material used comprises knitted pile fabric, preferably terry loop fabric. More particularly, the filter material used to form the filter bags 11, the filter belt 20 and the press filter leaves 29 comprises synthetic multi-filament yarn formed into stitches having particular characteristics. The yarn 40 (FIGS. 6 and 7) preferably is crimped polyester yarn having a denier in the range from about 70 to about 300. Preferably, the yarn 40 is circularly knitted into a tube of a predetermined diameter and at least a predetermined length, by being formed into courses (as shown in FIG. 5) having from about eight to about thirteen stitches per centimeter. Certain of the yarns (indicated at G in FIGS. 5-7) are knitted into stitches defining a ground or base fabric, while others of the yarns (T in FIGS. 5-7) are knitted into stitches defining terry loops extending from the ground to a height in a range of from about 0.5 to about four millimeters. The fabric is knitted in such a way that the stitches in the ground define open areas in a range of from about one micron to about one hundred microns. By virtue of the knitting of the yarn into stitches defining both a ground and pile extending from the ground, the stitch structure is locked against undesirable distortion and opening of the fabric, in a manner distinct from woven fabrics. As herein used, the term "pile fabric" refers to any knitted pile fabric including both terry loop and other pile constructions. Where fabric is knit in the form of a tube, a filter bag such as the bag 11 of FIG. 4 may be formed by cutting the tube to a desired shorter length and closing one end of the tube by sewing to form the fabric into a bag. Such a bag is "seamless" in that it does not have a longitudinal seam. Alternatively, the fabric may be opened into a flat or web form and then cut and sewn in whatever manner is necessary or appropriate to form a filter bag, a filter belt, a press filter leaf, or any other desired filter structure.

In use, the filter preferably is mounted in such a way that the piles T extend in the direction of the incoming flow. That is, in the specific form illustrated in FIG. 1, the filter bags are mounted with terry loop surfaces directed inwardly. In the belt filter arrangement of FIG. 2, the fabric of the belt 20 would be arranged with the terry loops directed upwardly. In the press filter arrangement of FIG. 3 the filter leaves 29 would be arranged with the terry loops facing the inlet, or to the right in that figure. In use, the terry loops are moved by the flow of fluid through the filter, rendering the filter in accordance with the present invention relatively self-cleaning during use. That is, movement of the terry loops induced by flow of fluid through the filter fabric induces sufficient movement of the separated material so as to avoid unequal loading of areas of the filter. At the same time, bending of the terry loops during such movement tends to aid in the separation of material from the flowing fluid stream. Due to the use of yarns capable of ready washing and of withstanding elevated temperatures, the filter may be readily cleaned and reused in a number of fluid environments. While this is the preferred orientation of the fabric during use, certain specific environments may require, in order to achieve maximum performance, positioning of the filter material with the terry loops directed downstream.

In the drawings and specification, there has been set forth a preferred embodiment of the invention, and although specific terms are employed, they are used in a generic and descriptive sense only and not for purposes of limitation.

What is claimed is:

1. A method of making fabric filter bags comprising circularly knitting crimped, synthetic yarn having a denier in the range of from about 70 to about 300 into a tube of predetermined diameter and at least a predetermined length while forming the yarn into stitches defining a ground and stitches defining terry loop pile extending from the ground to a predetermined height, the stitches defining open areas in the range of from about 1 micron to about 100 microns; and then sewing the fabric into a bag.

2. A method according to claim 1 wherein the step of knitting comprises forming the yarn into stitches defining terry loop pile extending from the ground to a height in the range of from about 0.5 mm to about 4 mm.

3. A method according to claim 1 wherein the step of knitting comprises forming the yarn into stitches and into courses having from about 8 stitches to about 13 stitches per centimeter.

4. A method according to claim 1 wherein the step of sewing comprises closing one end of the tube.

5. A method according to claim 1 wherein the step of sewing comprises slitting the tube and opening the fabric into a flat web, and then sewing the flat web fabric into a closed end tube of predetermined diameter and at least a predetermined length.

6. A fabric filter bag comprising a tube of circularly knitted crimped, synthetic yarn having a denier in the range of from about 70 to about 300 and knit into stitches defining a ground and stitches defining terry loop pile extending from the ground to a predetermined height, the stitches defining open areas in the range of from about 1 micron to about 100 microns, and the tube being closed at one end.

7. A fabric filter bag according to claim 6 wherein the stitches define terry loop pile extending from the ground to a height in the range of from about 0.5 mm to about 4 mm.

8. A fabric filter bag according to claim 6 wherein the stitches are formed in courses having from about 8 to about 13 stitches per centimeter.

9. A fabric filter bag according to claim 6 wherein the tube is seamless along the length thereof.

10. A fabric filter bag according to claim 6 wherein the tube is longitudinally seamed along the length thereof.

11. In a bag filter apparatus having a fabric bag for filtering material from flowing fluid, housing means for enclosing and supporting said bag, and circulating means including inlet and outlet means for directing a flow of fluid through said housing means and said bag, the improvement wherein said bag comprises a tube of circularly knitted crimped, synthetic yarn having a denier in the range of from about 70 to about 300 and knit into stitches defining a ground and stitches defining terry loop pile extending from the ground to a predetermined height, the stitches defining open areas in the range of from about 1 micron to about 100 microns, and the tube being closed at one end.

12. An apparatus according to claim 11 wherein the stitches define terry loop pile extending from the ground to a height in the range of from about 0.5 mm to about 4 mm.

13. An apparatus according to claim 11 wherein the stitches are formed in courses having from about 8 to about 13 stitches per centimeter.

14. An apparatus according to claim 11 wherein the tube is seamless along the length thereof.

15. An apparatus according to claim 11 wherein the tube is longitudinally seamed along the length thereof.

* * * * *